United States Patent [19]

Pohl

[11] 4,156,580
[45] May 29, 1979

[54] WIND-TURBINES

[76] Inventor: Lothar L. Pohl, Toronto Dominion Centre, Ste. 3800-Cermak, Toronto, Ontario, Canada

[21] Appl. No.: 825,860

[22] Filed: Aug. 18, 1977

[51] Int. Cl.$^2$ .................................................. F03D 3/02
[52] U.S. Cl. ........................................ 415/2; 415/60; 290/55; 416/197 A
[58] Field of Search ............... 415/2, 3, 4, 60, 213 R; 416/DIG. 4, 197 A; 290/43, 44, 54, 55

[56] References Cited

U.S. PATENT DOCUMENTS

| | | | |
|---|---|---|---|
| 839,312 | 12/1906 | Neumann | 415/213 R |
| 2,335,817 | 11/1943 | Topalou | 416/197 A |
| 2,431,111 | 11/1947 | Du Brie | 416/197 A |
| 2,812,823 | 11/1957 | De Ouiedo | 416/197 A |
| 3,203,182 | 8/1965 | Pohl | 415/202 |
| 3,732,032 | 5/1973 | Daweel | 415/213 R |

FOREIGN PATENT DOCUMENTS

| | | | |
|---|---|---|---|
| 384349 | 11/1923 | Fed. Rep. of Germany | 415/2 |
| 810500 | 8/1951 | Fed. Rep. of Germany | 415/2 |
| 2451751 | 5/1976 | Fed. Rep. of Germany | 415/2 |
| 973968 | 2/1951 | France | 415/60 |
| 2300235 | 10/1976 | France | 415/2 |
| 412772 | 2/1946 | Italy | 415/4 |

*Primary Examiner*—C. J. Husar

[57] ABSTRACT

The invention relates to an energy conversion system for converting kinetic energy possessed by the wind into mechanical energy, using a particular compact design for vertical axis rotors in combination with a specially adapted tower structure.

4 Claims, 7 Drawing Figures

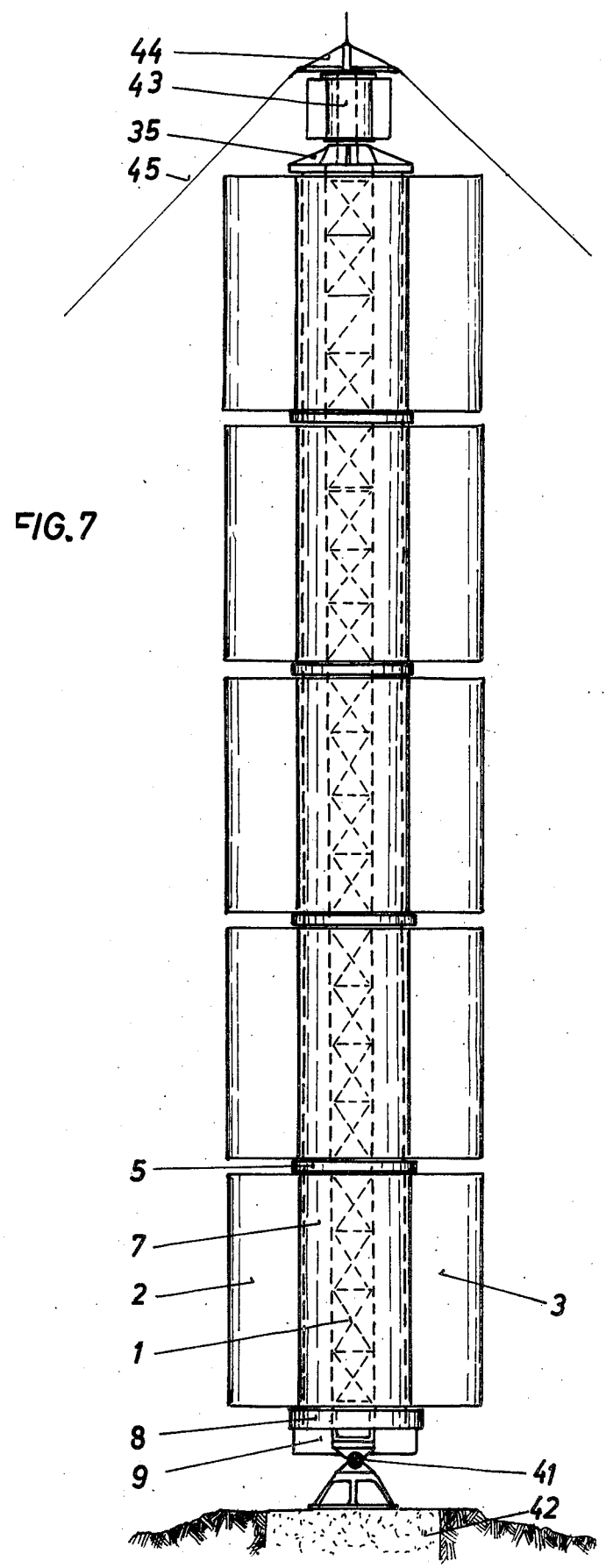
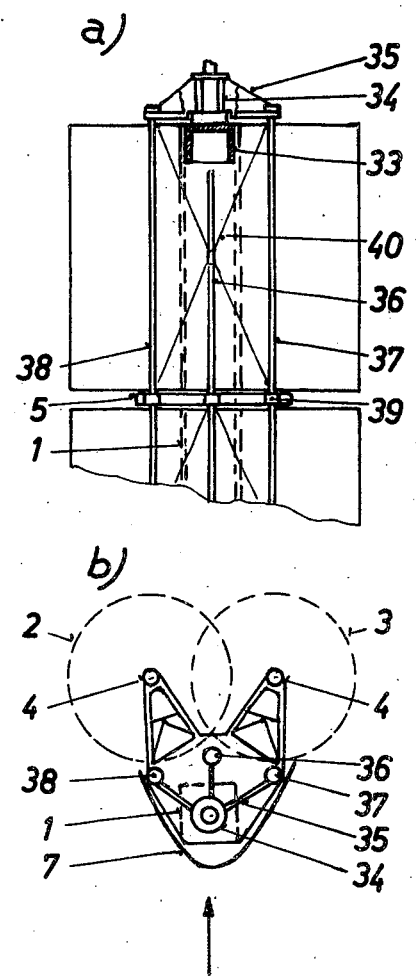

WIND-TURBINES

A survey of existing configurations for vertical axis windmills and windturbines shows, that these configurations can be divided in two groups. In the first group appear the configurations using sails cups and flat curved surfaces, as for instance the Savonius rotor, where more or less drag-differences between the parts, which rotate in wind-direction and the parts rotating against the wind, are the driving forces. The other group consists of windturbines with vertical arranged straight and bent blades, having aerofoil cross-sections, and rotate coaxially around a shaft and mounting structure, for instance Darrieus rotors, where mainly lift-forces effectuate a rotation. The first group has found only limited application in the instrumentation and ventilation field because of low efficiency. The other group of vertical axis windturbines encounters difficulties especially if the feasibility of large windpower units is inventigated, which are comparable in size to powerplants using fossil fuel. Then the building costs are progressing excessively and severe construction and stress-problems appear, which in consequence of the use of relatively thin-wall blades with considerable dimensions cannot be solved easely. Similar problems exist for the design of windturbines, having a horizontal axis, also described as axial flow turbines. Here the large rotating mass of rotor-blades, which are flexed continuously mainly by insteady aerodynamic and inertial loads, is a drawback for the development of large windpower-plants.

A primary object of the invention is to provide a windturbine-system using such configurations of vertical axis turbine rotors with very compact and robust forms, that these main stress-problems are eliminated and the building of large windpower plants becomes feasible and practical dependent on a material and weight saving design for low manufacturing cost.

It is another object of the invention, by combination of such vertical axis turbine rotors with a tower structure, having aerodynamic features and mechanical means, to increase the efficiency of the turbine rotors and to form an adequate control system for the speed of the turbine rotors.

It is further an object of this invention to provide a windturbine system having turbine rotors and support frames suspended from the top of the tower structure, to achieve an overall low-weight and low cost structural design for the turbine rotors and support frames.

With the above objects in mind the invention basically presents a wind energy conversion system, where at least a portion of the kinetic energy possessed by the wind is converted into mechanical energy comprising tangential flow turbine rotors for rotation around the vertical axis, each rotor having the form of a hollow prism with at least 3 vertical in wind-direction curved surfaces, having a vertical shaft mounted in end-bearings fitted into lower and upper intermediate support frames, and a tower structure to support a double row of turbine rotors, arranged vertically and symmetrically behind the tower structure in a down-wind position, having main-bearing assemblies for the intermediate support frames being allowed to swivel around the tower structure at least through the effect of wind forces and a wind-deflecting shield arranged in front of the tower structure, attached rigidly to the intermediate support frames. This wind-deflecting shield is curved convexly against the wind-direction on front of the tower structure and further extends symmetrically along both sides of the tower structure to the rotation circles of the turbine rotors. Thus guide surfaces for the airflow are formed, which are moderately inclined against the wind-direction and direct a tangential airflow over the curved surfaces of the turbine rotors but shield the turbine rotor segments rotating against the wind-direction, said tangential airflow having a direction to achieve optimum efficiency for the turbine rotors.

Usually the tower structure is a design in structural steel, having a rectangular cross-section, but also concrete towers having a round cross-section can be used for this windturbine system, to lower the building cost. Then the smooth outer surface of the round tower-structure in front of the turbine-rotors deflects the wind, while separate guide vanes, in wind-direction on both sides of the tower structure, rotatable around the vertical axis, the leading edges arranged close to the smooth outer surface of the tower structure, can direct the airflow against the curved surfaces of the turbine rotors with different angles of attack, thus influencing the rotational speed of the turbine rotors.

The combined weight of the turbine rotors and the intermediate support frames contributes to large bending moments, causing high stress conditions in the main bearing assemblies, tending to increase the complexity and cost of these large bearings. Also more power will be required to orient the turbine rotors into a downwind position. It is therefore an advantage to suspend the intermediate support frames and the turbine rotors from a rotable load carrying structure, positioned on top of the tower structure. The vertical shafts of the turbine rotors interconnected by flexible couplings serve only as torque transmissions downwards to a heavier main support frame, mounted close to the tower base, having a servicing platform with energy transforming installations as for instance an electric generator and auxiliary equipment.

To increase further the efficiency of the tangential flow turbine rotors, without essentially changing the compact and robust structure of a prism-form, a vertical slot is arranged in each of the vertical rotor surfaces, being curved in wind-direction first convexly, then concavely. Then in the cross-section polygon with at least 3 corners the convexly curved part of a polygon line extends from the leading corner approximately to half the distance, a straight line between two adjacent corners, while the concavely curved part extends from the trailing corner only less than half the distance. Thus in the corresponding vertical rotor surface a vertical slot is positioned just behind the convexly curved surface part, extending over the whole axial length. The 3 vertical slots in the vertical surfaces of said turbine rotor allow a limited airflow to pass through the turbine rotor, having a passage in the central part of the rotor.

Practical embodiments of the invention are described in detail together with presentation of following drawings.

Figure 4:
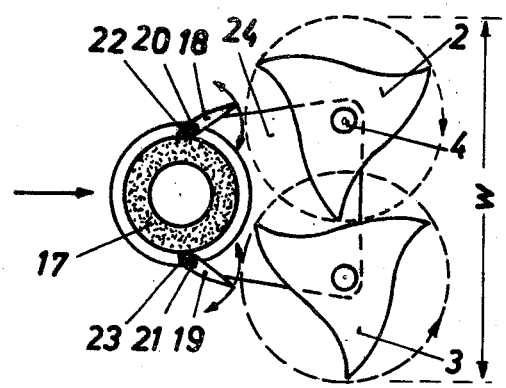

FIG. 4 presents a cross-section of a round concrete tower with a turbine rotor unit behind, provided with separate guide vanes.

Figure 5:
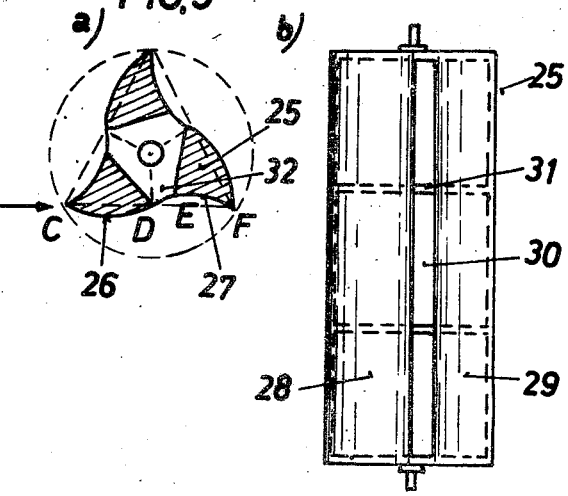

FIG. 5 shows the configuration of a vertical axis turbine rotor with the structural form of a prism, having vertical slots.

FIG. 6 shows the suspension system on top of the tower structure

FIG. 7 presents the front elevation of a windpower plant.

Figure 1:
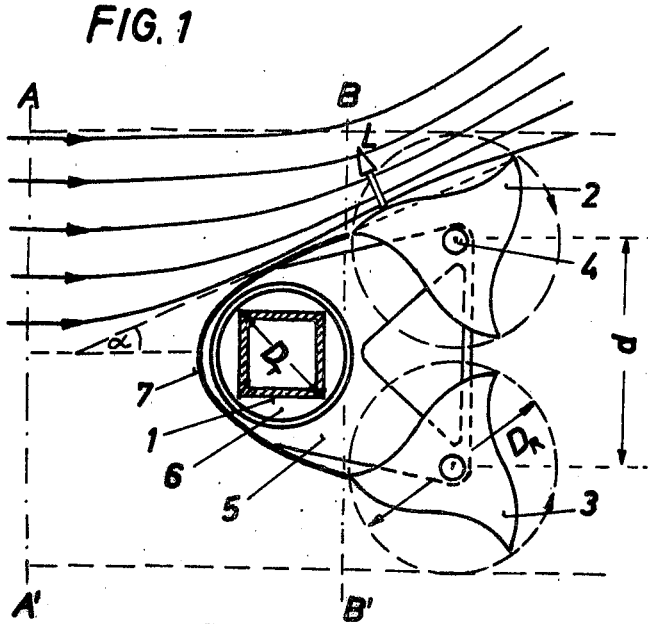
FIG. 1 shows a cross-section of a shielded tower structure with a turbine rotor unit behind, consisting of 2 vertical axis turbine rotors, each having the form of a prism.

In FIG. 1 the tower structure 1 consists of a conventional steel truss tower with rectangular cross-section. The turbine rotors 2 and 3 are arranged behind the tower structure in down-wind position and have each the form of a prism with the cross-section of a three-corner polygon. The 3 vertical surfaces of such a turbine rotor are curved in wind-direction moderately at first convexly, then concavely along the straight line between two corners of the polygon. The bearings 4 for the shafts of the turbine rotors are indicated and the intermediate support frame 5 can be seen, which is mounted along with the main bearing assembly 6 to the tower structure 1.

The wind-deflecting shield 7 is rigidly joined to the intermediate support frame 5 which can rotate freely around the tower structure 1.

The lay-out of such windturbine system is ruled by several characteristic parameters, which influence therefore the performance of the system. They are related to the airflow through the input area in AA', which corresponds to the overall width of the turbine system, and to the considerable smaller airflow through the area in BB', decreased in size by the vertical plane area protected by the shield. Further influential is the diameter $D_T$ of the tower structure, depending on the structural system used, which determines the minimum size of the shield, and the diameter $D_R$ of the turbine rotors having the distance d from each other. The airflow through the area in AA' towards the turbine rotors is deflected to a large extend beyond the area in BB', but part of the wind-energy loss is recovered again by the increased velocity of the airflow along the shield towards the turbine rotors. This effect can be compared with the spill-over effect and flow energy gain of a shroud around an axial flow turbine. The final inclination of the shield-surface close to the rotation circle of the turbine rotor, with the deflection angle towards the wind-direction($\alpha$), must be therefore only moderate, to achieve an optimum of the airflow acceleration. If the deflection angle ($\alpha$) is too large, the loss by the spill-over effect becomes excessive. It can be seen, that the diameters of the turbine-rotors $D_R$ and the distance d determine the position of the turbine rotors and the available input area in AA'. But too large a rotor diameter effects a low rotational speed, because the tip speed of the rotor will not exceed the peripheral wind velocity and the sensitivity for a low wind velocity is decreased. If the rotor diameter is determined, then also the distance d and the position of the turbine rotors follows, if one vertical rotor surface can be aligned in one rotational position of the rotor with the inclination of the shield surface. In this rotational position then a smooth tangential flow over the turbine rotor surface is attained having a favourable angle of attack in relation to the convexly curved surface part, and a maximum lift force is produced with a resulting main driving force.

Figure 2:
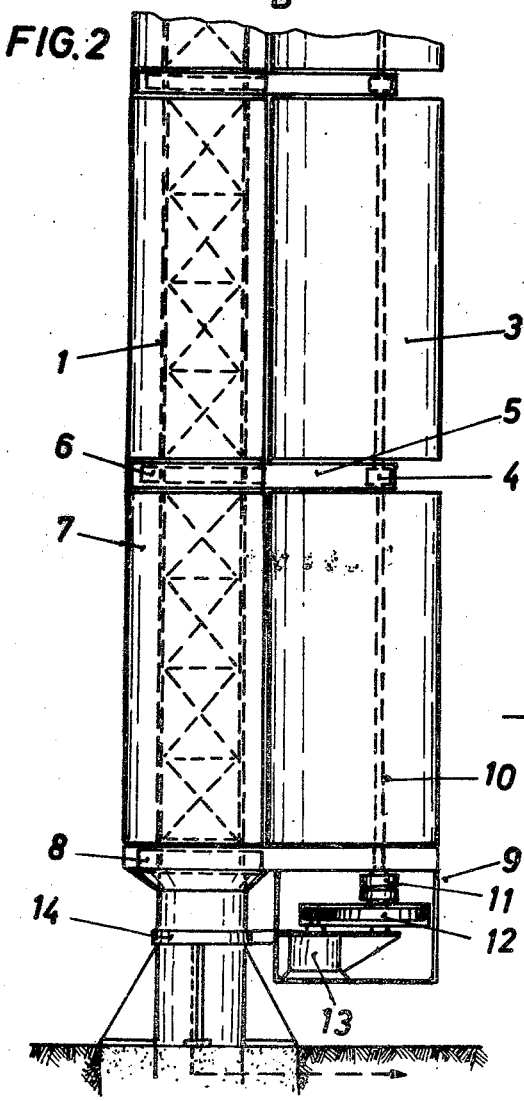
FIG. 2 is a partial view of a windturbine power-plant presenting the arrangement of several turbine rotor units with support frames and servicing platform.

In FIG. 2, corresponding to FIG. 1, can be seen the vertical row of turbine rotors 3 arranged in down-wind position behind the tower structure 1. The shafts 10 of the turbine rotors 3 are mounted in end-bearings 4, which are fitted into the intermediate support frames having the main bearing assemblies 6, mounted to the tower structure 1. The wind-deflecting shield 7 extends over the whole length of the vertical row of turbine rotors 3. A heavy main support frame 8 at the tower base, rotatable around the tower structure 1, is combined with a servicing platform 9 containing an energy transforming installation, auxiliary servo-equipment and control-instrumentation. The torque transmission shaft 10 of one vertical row of turbine rotors 3 is connected with the main flexible coupling 11 to the gearbox 12. The electric output from the generator 13 is taken off by a slide ring assembly 14.

Figure 3:
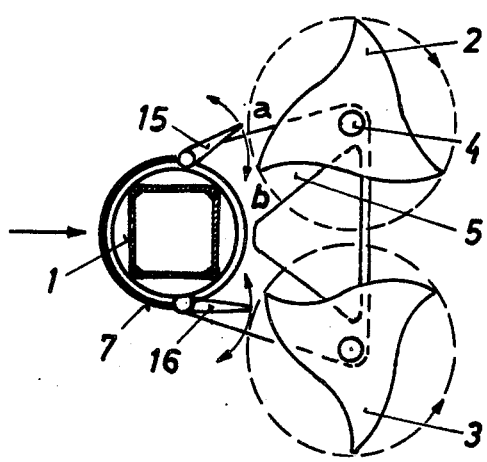
FIG. 3 shows a cross-section of a shielded tower structure with a turbine rotor unit behind, the shield being provided with guide vanes.

In FIG. 3 the wind-deflecting shield 7 in front of the tower-structure 1, joined rigidly to the intermediate support frame 5, is not extending towards the rotation circles of the turbine rotors, but is replaced there on both sides of the tower structure with the guide vanes 15 and 16. These vanes are connected smoothly to the shield 7 but are rotatable to a smaller degree from the position (a) to the position (b). If the guide vane has the position (a), then a tangential airflow will be directed over the convexly curved surface of the turbine rotor, if the rotational position as shown in FIG. 1 is reached, and the turbine rotor will rotate with maximum speed. If the guide vane has moved to the position (b) as indicated by the guide vane 16, then the airflow has the general direction towards the center line of the turbine rotor. Now only irregular vortices and drag-forces are produced, such that in one peculiar rotational position the turbine rotor ceases to rotate. Irregular movements or oscillations caused by wind-gusts can be damped by a braking arrangement. The guide vanes are actuated by a suitable speed-control system.

In FIG. 4 the tower structure is a prestressed concrete-tower 17 having a round cross-section and a smooth outer surface and serves also as a wind-deflecting object in front of the turbine-rotors. The rotatable guide vanes 18,19 are positioned on both sides of the concrete tower, seen in wind-direction, having shafts 20,21 mounted to the intermediate support frame 24. The leading edges 22,23 covering the shafts 20,21 against the wind-direction, are attached close to the smooth outer surface of the concrete tower, if the guide-vanes 18,19 are in a position (a) for maximum rotor speed and the deflected airflow from the front of the concrete tower passes without turbulence over the guide vanes. As leading edges can be used stripes of elastic material able to glide with minimum friction around the tower surface when the intermediate support frame is swivelling. Because the diameter of the prestressed concrete tower 17 can be kept relatively small, the overall width W of the windturbine system is reduced. Then without loss of useful wind-energy in front the turbine-rotors are positioned more closely to each other, both rotation circles overlapping, while the rotation is synchronized in the gearbox 12. Consequently the omission of the large shield in front of the turbine-rotors, the lower wind-pressure upon the tower structure and the smaller dimensions of the supporting structures contribute to lower building cost.

In FIG. 5a the cross-section of the turbine rotor 25 has the form of a 3-corner polygon. Each polygon line is curved along the straight line C–F between two corners, seen in wind-direction, first convexly 26, then concavely 27. The convexly curved part of the polygon-line extends from the leading corner C to the point D, being a midpoint of the straight line C–F. The concavely curved part of the polygon-line extends from the trailing corner F only to the point E, thus the curved polygon line is interrupted beween the midpoint D and point E.

In FIG. 5b the side elevation of the turbine rotor shows the surfaces 28,29 corresponding to the curved polygon lines C–D and E–F and a slot 30 between said surfaces, having a width and position corresponding to the position of the points D and E, while extending over the whole length of the turbine rotor 25. Indicated are further structural re-inforcements 31 to secure the form of the curved surfaces. By arrangement of the slot 30, a passage 32 is formed for an airflow through the central part of the turbine rotor, improving in a peculiar rotational position of the rotor the airflow around the rotor and therefore the performance. For instance in FIG. 4 can be seen, that the recirculated and accumulated air in the rear-area of the tower-structure is released then through a slotted turbine rotor. This slot arrangement does not interfere with the lift-generating capability of the convexly curved surfaces along the leading edges and does not weaken essentially the compact and sturdy prism construction of the turbine rotor.

In FIG. 6a is mounted on top of the tower structure 1, which has here as an example the form of a steel truss structure, coaxially the structural frame 33, supporting on a hub the thrust bearing assembly 34 for the rotatable load carrying structure 35. Seen against wind-direction, the rotors with the shafts are omitted to show the arrangement of the whole suspension system. The rotatable structure 35 is connected by vertical suspension rods 36,37,38 to the intermediate support frame 5 underneath. These suspension rods are connected with couplings 39 to the next set of suspension rods for the following rotor unit downwards. Close to the base of the tower structure the suspension rods are secured in the main support frame 8, but without exercising a substantial vertical force on this support frame. To increase the rigidity of the suspension rod system tension cables 40 are provided.

In FIG. 6b a top view of the rotatable structure 35 is illustrated with the thrust bearing assembly 34 and the main mounting heads of the suspension rods 36,37,38. Two structural extensions from the rotatable structure 35 sustain the end bearings 4 of the shafts for the turbine rotors 2,3. Also is indicated the tower structure 1 with the wind-deflecting shield 7. Suspending most of the weight of turbine rotors and intermediate support frames relieves the large diameter main bearing assemblies from bending moments, which otherwise could interfere with the smooth operation of said bearings. Thus these bearings can be low-cost plain bearings of small width, dimensioned only for loads by wind pressure forces in about horizontal direction. The thrust bearing assembly 34 has a relatively small diameter, but sufficient height to allow for instance installation of a set of double row roller bearings for high and complex loading. The suspension rods also, re-inforced by diagonal struts, form a rigid structural system to limit a swaying of the turbine rotor units from a common vertical line and to dampen possible oscillations in the vertical row of turbine rotors.

In FIG. 7 is presented the front elevation of a complete wind-power plant of considerable size, having a tower structure 1 in form of a steel truss structure with a constant cross-section width up to the top, but employing heavier truss-sections close to the base of the tower. The weight of the whole power plant rests upon a single self-aligning bearing 41, mounted on the foundation 42. This bearing consists for instance of one large alloy-steel ball permitting minor lateral swaying movements of the tower structure 1 without development of dangerous bending stress. At the base of the tower structure 1 is mounted the main support frame 8, rotatable around the tower structure. Underneath the main support frame 8 is suspended the servicing platform 9. Upwards along the tower structure 1 are mounted a number of turbine rotor units 2,3 of the same size and the intermediate support-frames 5. The wind-deflecting shield 7 extends from the main support-frames 8 to the top of the tower structure 1, where the rotatable load-carrying structure 35 is mounted on a hub of the structural frame 33 which is co-axially positioned on top of the tower structure 1. Above said structure 35 an auxiliary turbine rotor unit 43 of a smaller size is mounted on an extension of the hub of the structural frame 33. Further above the auxiliary turbine rotor unit 43 an anchor plate 44 can be seen for cables 45 of the guyed tower structure 1. The general lay-out of the wind-power plant is determined by the requirements for simplicity, low weight and cost and suitability for mass-production, without lowering the efficiency of the power-system to an impratical value, but sustaining a high degree of durability also under severe weather conditions. Structural parts and turbine-rotors form building modules of standarized size, which can be combined in various numbers for different power outputs. One turbine rotor has a weight saving design, which is similar to an aircraft-wing structure, but has a simplified aluminum frame work to secure the cross-section form only under far less aerodynamic loading. The vertical prism-surfaces of the turbine rotor are covered with weather resistant light material as for instance aluminum foil and re-inforced plastic sheets, while as construction material honey-comb structures and urethan-foam can be preferably used. The horizontal bottom and top faces of the turbine rotor are left uncovered, thus saving material and avoiding under winter conditions a piling-up of snow, which could hamper the operation of the power plant. A small degree of form flexibility of the turbine rotors and temporarely deflexed surfaces, caused by excessive wind pressure and temperature influence, will not change the performance significantly and can be tolerated. The shafts of the turbine rotors are mounted in self-aligning bearings and flexible couplings, while the shaft diameters and bearing dimensions closer to the tower base are increased, to be able to transfer the torque increasing with the number of turbine rotor units and therefore length of shaft assembly. The built-in mechanical flexibility of the tower structure and turbine rotors requires a suitable oscillation dampening system, preferably electronically controlled, but lowers the otherwise high building-cost if an absolutely rigid system of high strength is pursued. The addition of at least one smaller turbine rotor unit for high rotor speed on top of the tower structure improves the starting capability of the power plant at moderate wind velocities and provides power for auxiliary equipment also when the power plant is not in operation. The use of a single prestressed concrete tower for a power plant of medium size can be cost saving especially because the large deflecting shields are then omitted. But if a very large power-output is required the steel-truss structure should be preferred. Several such guyed towers of considerable height can be combined in a power plant group, where the towers are positioned in a circle for instance, and spaced only so far, as not to interfere aerodynamically with each other. The towers of such power plant group can be guyed together to form a tower group of high stability and durability also suitable for sites close to sea and ocean shores with extreme high wind-velocities.

The embodiments of the invention in which an exclusive property is claimed are defined as follows:

1. A wind-driven turbine system for converting at least a portion of the kinetic energy possessed by the wind into mechanical energy, comprising tangential flow turbine rotors for rotation around the vertical axis, each rotor having the form of a hollow prism with at least three vertical in wind-direction curved surfaces having a vertical shaft mounted in end-bearings fitted into lower and upper intermediate support frames and a tower structure to support a double row of turbine rotors, arranged vertically and symmetrically behind the tower-structure in a down-wind position, having main-bearing assemblies for the intermediate support frames being allowed to swivel around the tower-structure at least through the effect of wind-forces and a wind-deflecting shield arranged in front of the tower-structure, attached rigidly to the intermediate support frames, said shield being curved convexly against the wind-direction on front of the tower-structure, further extending symmetrically along both sides of the tower-structure to the rotation-circles of the turbine-rotors forming for the airflow guide surfaces, being moderately inclined against the wind-direction, thus shielding the turbine-rotor segments rotating against the wind-direction and directing a tangential airflow over the curved surfaces of the turbine-rotors.

2. A wind-driven turbine system for converting at least a portion of the kinetic energy possessed by the wind into mechanical energy, comprising tangential flow turbine rotors for rotation around the vertical axis, each rotor having the form of a hollow prism with at least three vertical in wind-direction curved surfaces, having a vertical shaft mounted in end-bearings fitted into lower and upper intermediate support frames and a tower structure to support a double row of turbine-rotors, arranged vertically and symmetrically behind the tower structure in a down-wind position, having main bearing assemblies for the intermediate support frames being allowed to swivel around the tower structure at least through the effect of wind-forces, said tower structure having a circular cross-section and a compact and smooth outer surface, thus being a wind-deflecting object in front of the turbine rotors, while separate guide-vanes in wind-directiom on both sides of the tower structure, rotatable around the vertical axis, but mounted on the intermediate support frames, extend symmetrically in wind-direction along both sides of the tower structure to the rotation-circles of the turbine rotors, the leading edges of the guide-vanes arranged close to the smooth outer surface of the tower structure, thus by rotation of the guide-vanes to a small degree effecting a change of the angle of attack for the airflow against the curved surfaces of the turbine-rotors.

3. A wind-driven turbine sytem for converting at least a portion of the kinetic energy possessed by the wind into mechanical energy, comprising tangential flow turbine rotors for rotation around the vertical axis, each rotor having the form of a hollow prism with at least three vertical in wind-direction curved surfaces, having a vertical shaft mounted in end-bearings fitted into lower and upper intermediate support frames and a tower structure to support a double row of turbine rotors, arranged vertically and symmetrically behind the tower structure in a down-wind position, having main bearing assemblies for the intermediate support frames being allowed to swivel around the tower structure at least through the effect of wind-forces, said turbine rotors having vertical shafts being interconnected by flexible couplings for torque-transmission to a main support frame, rotatable around the tower-structure, preferably mounted close to the tower-base having a servicing platform with energy transforming installations and auxiliary equipment and said tower structure having a separate load carrying structure on the top, mounted to rotate coaxially around the tower structure, with at least one beam extending beyond the swivelling circle of the turbine rotor shafts, being rigidly connected with the intermediate support frames undermeath by structural means, thus the turbine rotors and intermediate support frames being suspended from the load-carrying structure on the top of the tower structure, at least partially.

4. A wind-driven turbine system for converting at least a portion of the kinetic energy possessed by the wind into mechanical energy, comprising tangential flow turbine rotors for rotation around the vertical axis, mounted in end-bearings, fitted into lower and upper intermediate support frames and a tower-structure to support a double-row of turbine rotors arranged vertically and symmetrically behind the tower structure in a down-wind position, having main-bearing assemblies for the intermediate support frames, being allowed to swivel around the tower structure at least through the effect of wind-forces, said turbine rotors having the structural form of a prism with the cross-section of a polygon with at least three corners, the polygon-lines being curved in wind-direction first convexly then concavely, the convexly curved part extending from the leading corner approximately throughout half the distance in a straight line between two adjacent corners, the concavely curved part extending from the trailing corner only less than half the distance in a straight line between two adjacent corners, thus the vertical in wind-direction curved surfaces of the turbine-rotor being interrupted by a vertical slot, extending over the whole axial length, presenting a passage for a limited airflow through the turbine rotor.

* * * * *